United States Patent [19]

Kuchuk-Yatsenko et al.

[11] Patent Number: 4,733,044
[45] Date of Patent: Mar. 22, 1988

[54] METHOD FOR CONTROLLING A FLASH-BUTT RESISTANCE WELDING PROCESS

[75] Inventors: Sergei I. Kuchuk-Yatsenko; Mikhail V. Bogorsky; Valery G. Krivenko; Daniil I. Belyaev; Sergei M. Samotryasov; Anatoly P. Nizov; Alexei I. Gorishnyakov, all of Kiev, U.S.S.R.

[73] Assignee: Institute Electrosvarki Im. Patona, Kiev, U.S.S.R.

[21] Appl. No.: 943,664

[22] Filed: Dec. 18, 1986

[51] Int. Cl.$^4$ ............................................. B23K 11/04
[52] U.S. Cl. ...................................... 219/100; 219/97
[58] Field of Search ................... 219/97, 100, 104, 101

[56] References Cited

U.S. PATENT DOCUMENTS 3,980,857  9/1976  Sciaky ................................. 219/97

FOREIGN PATENT DOCUMENTS 2726384  12/1978  Fed. Rep. of Germany ........ 219/97
984296   2/1965   United Kingdom .
226745   4/1968   U.S.S.R. .

OTHER PUBLICATIONS

S.I. Kuchuk-Yatsenko, V. R. Lebedeb, "Resistance Welding with Continuous Flashing," Kiev, Naukova Dumka, 1976 p. 51, Fig. 28.

Primary Examiner—Clifford C. Shaw
Attorney, Agent, or Firm—Lilling & Greenspan

[57] ABSTRACT

The disclosed process includes the steps of and upsetting the flashing parts being welded. The flashing is conducted with concurrent measurement of useful electric power and an electric parameter of the flashing process which is related to the power by a function which maximizes the useful power at a predetermined value of said electric parameter. Then the value and sign of the power and parameter increments are determined within one and the same period of time. The parts are brought closer together up to the moment when the ratio of the power and parameter increments reverses ints sign. Then the parts begin to be separated up to the moment when the value of said ratio reaches the preset value selected to suit the welding circuit resistance and the cross sectional area of the welded parts.

1 Claim, 3 Drawing Figures

METHOD FOR CONTROLLING A FLASH-BUTT RESISTANCE WELDING PROCESS

BACKGROUND OF THE INVENTION

1. Field of the Invention

The present invention relates to the field of butt resistance welding and, more particularly, to a flash-butt resistance welding process.

The invention can be used to advantage for welding thick-walled or large compact parts on machines for flash-butt resistance welding.

2. Description of the Prior Art

Known in the prior art is a flash-butt resistance welding process (UK Pat. No. 984,296, Cl. B23K, 1965) with a preheating cycle in which the parts are heated at the initial welding stage, using a resistance method. The parts are preheated by periodic short-time current pulse. The current is interrupted either by opening of the welding circuit by reciprocating motion of one of the parts, or by periodic disconnection of the welding transformer primary winding from the mains. The parts are periodically drawn together to form a steady contact between their touching surfaces and then they are drawn apart to open the welding circuit.

However, the known process fails to ensure uniform heating of parts across their section, hence it fails to ensure high quality of the welded joint.

Also known in the prior art is a flash welding process without preheating (USSR Inventor's Certificate No. 226,745 IPC H05B, publ. 1968) which ensures a high quality of the welded joint. In this process the converging speed of the welded parts is periodically and momentarily raised. With a sharply raised speed the number of elementary contacts arising between the surfaces of the welded parts increases greatly and after a decrease of this speed the number of concurrently existing contacts remains the same within a certain time. The speed changes are regulated so that after the current (voltage, power) is increased to a certain limit, the speed begins to be reduced to the initial value which rules out the short circuit between the butts of the parts. However, during the reduction of speed it becomes practically impossible to avoid opening of the welding circuit which brings about pauses in the process of flashing. This calls for increasing the welding time and this reduces the output.

SUMMARY OF THE INVENTION

An object of the invention is to provide steady flashing conditions at a high value of useful electric power released in the parts being welded.

The essence of the invention resides in a flash-butt resistance welding process comprising a flashing of parts being welded and an upsetting thereof, the direction of speed of motion of the flashed parts being changed by drawing them together and spreading them apart. According to the invention, the flashing of the welded parts is accompanied by measuring a useful electric power and an electric parameter of the flashing process related to the useful electric power by a function which maximizes the useful power at a predetermined value of said electric parameter, determining the value and the sign of the increment in the useful electric power and the electric parameter of the flashing process within one and the same time interval, bringing together the parts being welded up to the moment when the ratio of the increment in the useful electric power to the increment in the electric parameter of the flashing process reverses its sign after which the parts being welded are drawn apart up to the moment when the ratio of increment in the useful electric power to the increment in the electric parameter of the flashing process reaches the preset value which is selected according to the resistance of the welding circuit and the cross sectional area of the parts being welded.

The herein-proposed invention steps increases the intensity of heating of the parts being welded and curtails the welding time.

BRIEF DESCRIPTION OF THE DRAWINGS

Now the invention will be described by way of an example with reference to the accompanying drawings in which.

DESCRIPTION OF A PREFERRED EMBODIMENT

Figure 1:
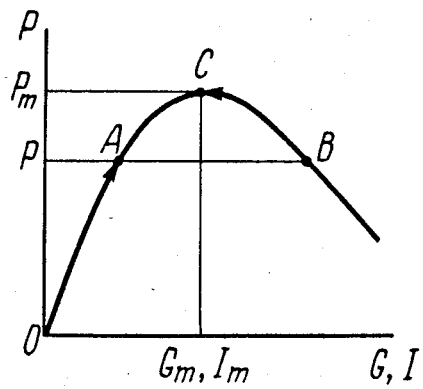
FIG. 1 shows the dependence of a useful electric power P released at the contact between parts being welded as a function of the conductance G of the spark gap (or as a function of the current I in the welding circuit), according to the invention.

The dependence of a useful electric power P released at the contact between parts being welded as a function of the conductance G of a spark gap or as a function of the welding circuit current I is shown in FIG. 1 (cf S. I. Kuchuk-Yatsenko, V. K. Lebedev "Resistance welding with continuous flashing", Kiev, "Naukova Dumka", 1976, p. 51. FIG. 28). One and the same useful power P permits realization of two kinds of flashing characterized by points A and E. Flashing conditions at the point A are considered steady since they provide all the prerequisites for self-regulation of the process: a positive increment in current corresponds to a positive increment in power. The flashing conditions at the point B cannot be regarded as steady since the positive increment in current corresponds to the negative increment in useful power and the flashing process may cause a short circuit.

The dependence of the useful power P on the current I in the welding circuit is of an extreme nature. The maximum useful power $P_m$ is released at the contact at a welding current $I_m$ when the resistance of the spark gap is equal to the short circuit impedance in the welding circuit which corresponds to the flashing conditions at a point C in FIG. 1.

Therefore, it is expedient that the flashing process be conducted under the conditions characterized by such welding current I and useful electric power P when said conditions are described by the left-hand part of the chart $P = f(I)$ closely approaching the value of $P = P_m$. These conditions ensure steady flashing at a high value of the useful electric power P released in the parts being welded.

Limiting the convergence of parts to the point of reaching the negative value of the ratio of the increment in the useful electric power to the increment in the welding current permits the welding process to be conducted in the steady flashing zone. At an insignificant displacement of the process from the point C to the right (relation $\Delta P/\Delta I < 0$, unsteady flashing) the parts begin to diverge, the flashing will resume its steady nature and will be characterized by a section of the curve with a positive value of the ratio $\Delta P/\Delta I$. The parts continue to be drawn apart until the preset positive value of the ratio $\Delta P/\Delta I$ is reached. This ratio is selected with a view to ensuring the flashing process without interruptions in the welding current and maintaining a high value of the useful electric power. If the parts are drawn apart until the ratio $\Delta P/\Delta I$ rises higher than the preset value, this may cause interruptions of the welding current and a reduction of the useful electric power.

To achieve the object of the invention, the welding voltage is turned on and the parts begin to be drawn together at a preset speed. As the parts come closer to each other and contacts are established, the welding current I and useful electric power P grow. The increment in the useful electric power P and the current I ($\Delta P$ and $\Delta I$) are measured within one and the same time interval. The entire section of the curve from a point O to the point C has a positive value of the ratio $\Delta P/\Delta I$. As the number of contacts grows further, the value of the current I exceeds the value of $I_m$ so that the positive increment $\Delta I$ will correspond to the negative increment $\Delta P$ measured within one and the same time interval. This will serve as a signal for drawing apart the parts being welded at a preset speed. The number of contacts will begin diminishing, the welding current will drop and the ratio $\Delta P/\Delta I$ will again acquire a positive value. Limiting the divergence of the welded parts to the moment when the ratio $\Delta P/\Delta I$ reaches a certain positive value permits avoiding interruptions of the welding current. For the butt resistance welding of parts with a welded section of 2000 to 10,000 mm$^2$ on machines with a short circuit impedance varying from $80 \cdot 10^{-6}$ to $250 \cdot 10^{-6}$ Ohms the positive value of the ratio $\Delta P/\Delta I$ was selected from 2 to 10 W/A.

The disclosed method steps up the welding efficiency, intensifies the heating of the flashed parts by reducing the interruptions in the current flow. Besides, the flashing is conducted under the conditions approaching those with a maximum useful electric power.

Figure 2:
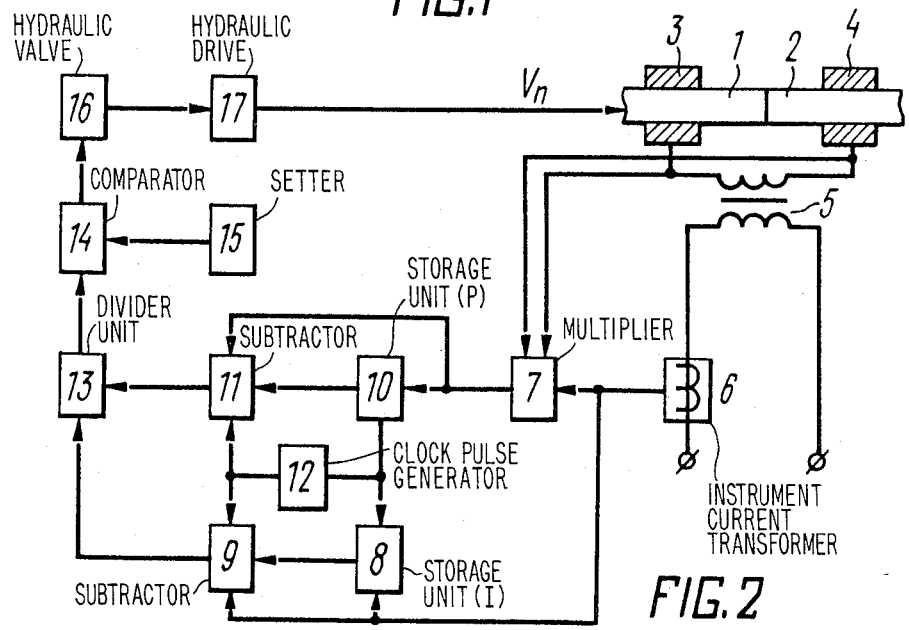
FIG. 2 is a block diagram of an apparatus for realizing the flash-butt resistance welding process according to the invention.

A block diagram of an apparatus for realizing the flash-butt resistance welding appears in FIG. 2.

Parts 1 and 2 (FIG. 2) to be welded are clamped in welding dies 3 and 4 connected to which is a secondary winding of a welding transformer 5. A primary winding of the transformer 5 is connected to an instrument current transformer 6 whose output is connected to one of the inputs of a multiplier unit 7 and its other input is connected to the dies 3 and 4. Besides, the output of the current transformer 6 is connected to an input of a storage unit 8 intended to record the values of the welding current, and to an input of a subtracter unit 9 which determines the increments in the welding current I within a certain period of time.

An output of the multiplier unit 7 is connected to an input of a storage unit 10 whose function is to record the values of the useful electric power, and to an input of a subtracter unit 11 which determines an increment in the useful electric power within a certain period of time. The inputs of the storage units 8, 10 and of the subtracter units 9, 11 are connected to an output of a clock pulse generator 12. Outputs of subtracter units 9 and 11 are connected to inputs of a divider unit 13 intended to determine the ratio $\Delta P/\Delta I$, i.e. the ratio increment $\Delta P$ in the useful electric power P to the increment $\Delta I$ in the welding current I. An output of the divider unit 13 is connected to one of the inputs of a comparator 14 which compares the signal corresponding to the calculated value of the ratio $\Delta P/\Delta I$ with the signal corresponding to the selected value of this ratio. The other input of the comparator 14 is connected with a setter 15 while its output is connected to an input of a solenoid-operated hydraulic valve 16 which is connected to a hydraulic drive 17 operatively associated with the die 3 and the part 1.

Figure 3:
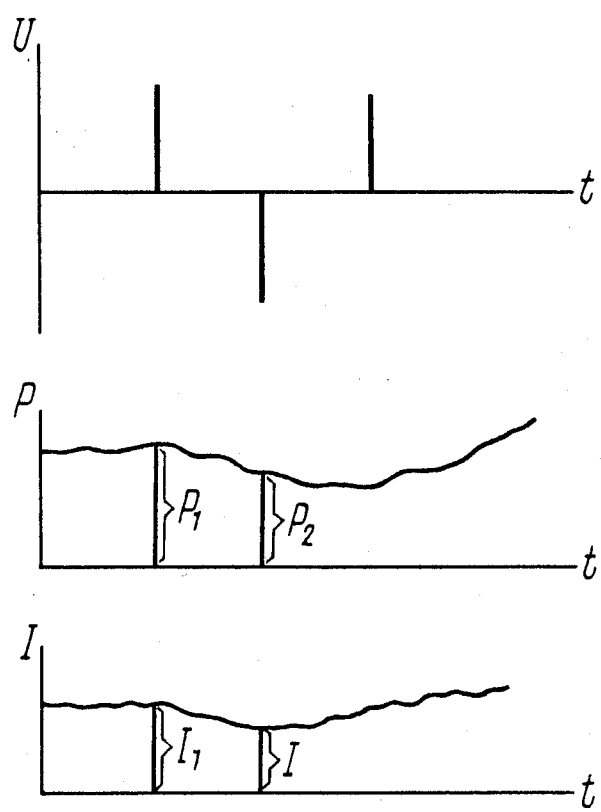
FIG. 3 illustrates timing charts explaining the functioning of the apparatus for realizing the disclosed process, according to the invention.

Shown in FIG. 3 are:
U=u(t)—diagram of clock pulses generated by the clock pulse generator 12 (FIG. 2);
P=p(t)—useful electric power chart;
I=i(t)—welding current chart.

The apparatus function as follows.

At the initial moment of welding, the setter 15 (FIG. 2) shapes a signal with a preset voltage level. This signal is delivered to the input of the comparator 14. Comparing this signal with a zero signal coming in from the output of the divider unit 13, the comparator 14 generates a signal which converges parts 1 and 2 by means of the solenoid-operated hydraulic valve 16 and hydraulic drive 17. At the same time the parts 1 and 2 are put under voltage from the welding transformer 5 via the dies 3 and 4. As contacts are established on the butt ends of the parts 1 and 2, the welding current appears in the secondary winding of the welding transformer 5. An output signal of the current transformer 6 flows into one of the inputs of the multiplier unit 7 and into the inputs of the storage unit 8 and subtracter unit 9. The other input of the multiplier unit 7 receives a signal corresponding to the voltage on the portions of the parts 1 and 2 between the dies 3,4. The signal taken from the clamping dies 3,4 is multiplied by the multiplier unit 7 on a certain scale by the signal supplied from the output of the current transformer 6. As a result, a signal shaped at the output of the multiplier unit 7 is proportional to the value of the useful electric power of the welding machine. This signal flows to the input of the storage unit 10 and to the input of the subtracter unit 11. The clock pulse generator 12 generates counter-phase clock pulses (chart U=u(t) shown in FIG. 3). As a positive clock pulse comes in, the storage unit 8 (FIG. 2) record the value of current $I_1$ (FIG. 3, chart I=i(t)) and the storage unit 10 (FIG. 2) records the value of power $P_1$ (FIG. 3, chart P=p(t)). The signals corresponding to these values of $I_1$ and $P_1$ are applied, respectively, to the subtracter units 9 and 11 (FIG. 2) whose other inputs receive signals corresponding to the current values of the welding current and useful electric power.

When the generator 12 shapes negative clock pulses (FIG. 3, chart U=u(t)), the unit 9 (FIG. 2) performs the operation $\Delta I = I_1 - I_2$ while the unit 11 performs the operation $\Delta P = P_1 - P_2$. The signal corresponding to the increment $\Delta I$ is delivered from the output of the unit 9 and the signal corresponding to the increment $\Delta P$ is delivered from the output of the unit 11, to the inputs of the divider unit 13 which divides $\Delta P/\Delta I$. The signal proportional to the value of $\Delta P/\Delta I$ is delivered from the output of the divider unit 13 to the input of the comparator 14.

As the parts 1 and 2 being welded come closer to each other, the welding current I (FIG. 1) constantly grows and the point describing the flashing process is displaced over the curve to the point C. The ratio $\Delta P/\Delta I$ being previously positive, takes a zero value at the point C and becomes negative as the current I grows further.

When the negative signal is delivered from the divider unit 13 (FIG. 2) to the comparator 14, said comparator is switched over so that it shapes a fixed signal which moves the parts 1 and 2 apart by means of the solenoid-operated hydraulic value 16 and hydraulic drive 17.

On separation of the parts 1 and 2 the welding current I (FIG. 1) diminishes and, after transition through point C, the ratio $\Delta P/\Delta I$ takes a positive value and starts growing. When the positive signal proportional to the ratio $\Delta P/\Delta I$ and compared in the comparator 14 (FIG. 2) becomes equal to the signal shaped by the setter 15, the comparator 14 generates a fixed signal which brings the parts 1 and 2 together by means of the solenoid-operated hydraulic valve 16 and hydraulic drive 17.

Thus, the herein-proposed invention enables realization of flash-butt resistance welding in which the flashing process is conducted in the steady zone at a high level of the useful electric power which intensifies the heating of the parts 1 and 2 being welded and curtails the welding time.

This positive effect is attained due to concurrent measurements of the useful electric power P and the welding current I, determination of the ratio $\Delta P/\Delta I$ of the increment $\Delta P$ in the useful electric power P to the increment $\Delta I$ in the welding current I within one and the same time interval and the flashing process is conducted so that the ratio $\Delta P/\Delta I$ will not take a negative value for any considerable time while limiting the positive value of the ratio $\Delta P/\Delta I$ by a value determined to suit the resistance of the welding circuit and the cross sectional area of the parts 1 and 2 being welded.

What is claimed is:

1. A flash-butt resistance welding process comprising the steps of:
   flashing of parts being welded;
   upsetting the parts being welded;
   changing the direction of motion of the parts being welded during said flashing step by bringing together and separating the parts being welded;
   measuring during said flashing step, at the same moment of time, the useful electric power and an electric parameter of the flashing process which is related to said useful electric power by a function which maximizes the useful power at a predetermined value of said electric parameter;
   determining during said flashing step an increment in said useful electric power and an increment in said electric parameter of the flashing process within the same period of time;
   determining during said flashing step the value and the sign of the ratio of said increments in said useful electric power and electric parameter of the flashing process;
   ensuring during said flashing step the bringing together of the parts being welded up to a first moment when said ratio of said increments in said useful electric power and electric parameter of the flashing process reverses its sign;
   ensuring during said flashing the separation of said parts being welded from said first moment to a second moment when said value of said ratio of said increments in said useful electric power and electric parameter of the flashing process reaches a preset value selected to suit the resistance of the welding circuit and the cross sectional area of the parts being welded.

* * * * *